May 3, 1960 A. B. GUNTHEL, JR 2,935,550
CONNECTORS FOR ELECTRICAL CABLES OR CONDUCTORS
Original Filed Jan. 18, 1955 3 Sheets-Sheet 1
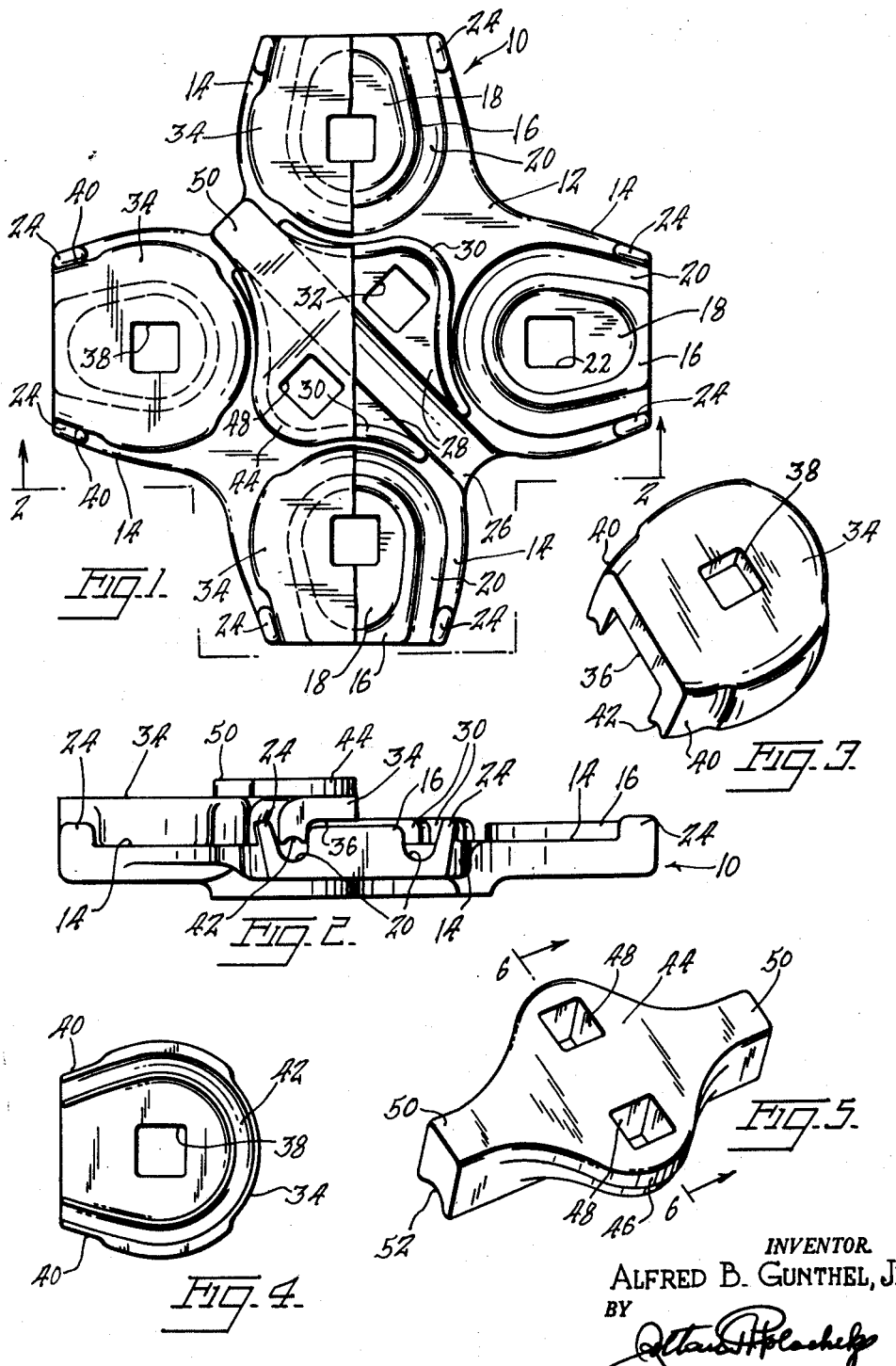
INVENTOR.
ALFRED B. GUNTHEL, JR.
BY
ATTORNEY May 3, 1960 — A. B. GUNTHEL, JR — 2,935,550
CONNECTORS FOR ELECTRICAL CABLES OR CONDUCTORS
Original Filed Jan. 18, 1955 — 3 Sheets-Sheet 2
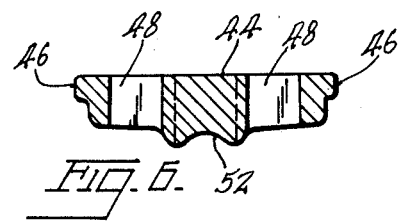
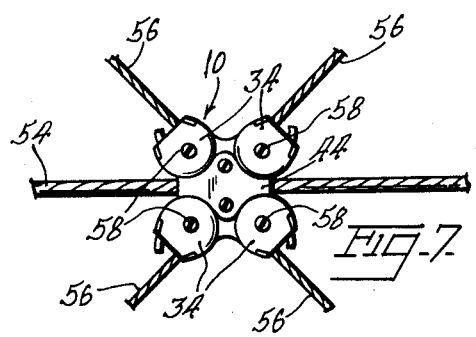
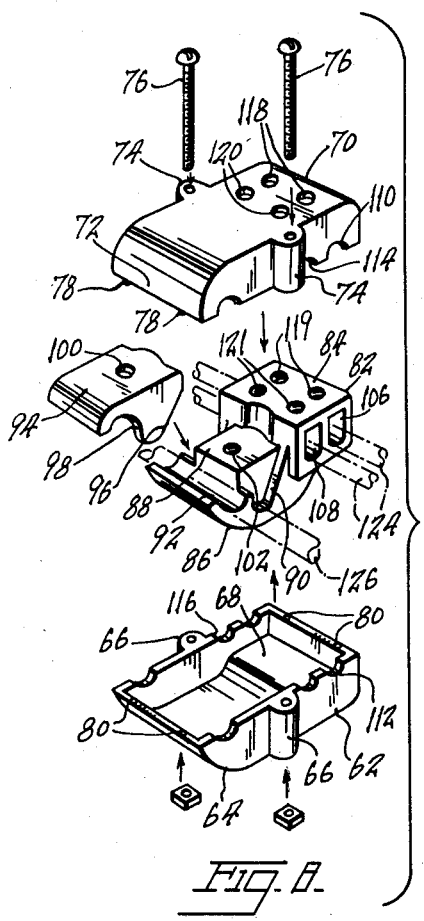
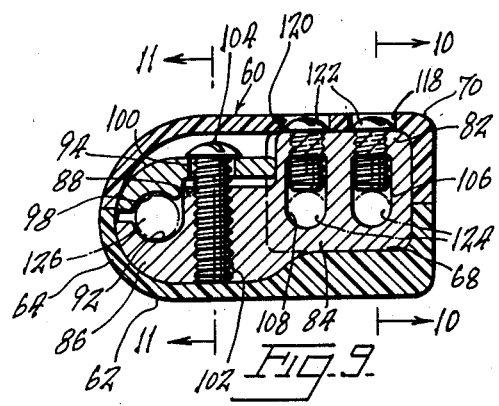
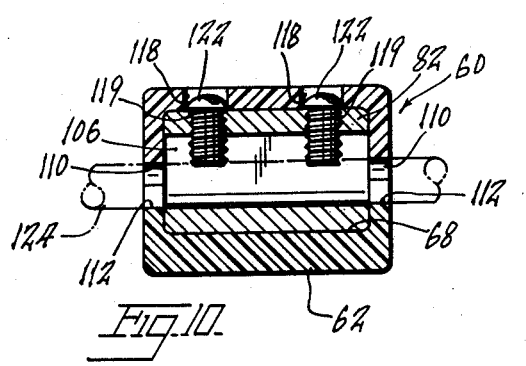
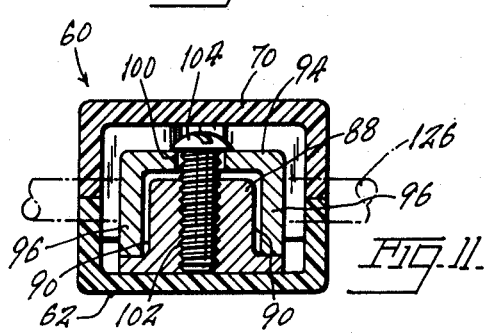
INVENTOR.
ALFRED B. GUNTHEL, JR.
BY
ATTORNEY

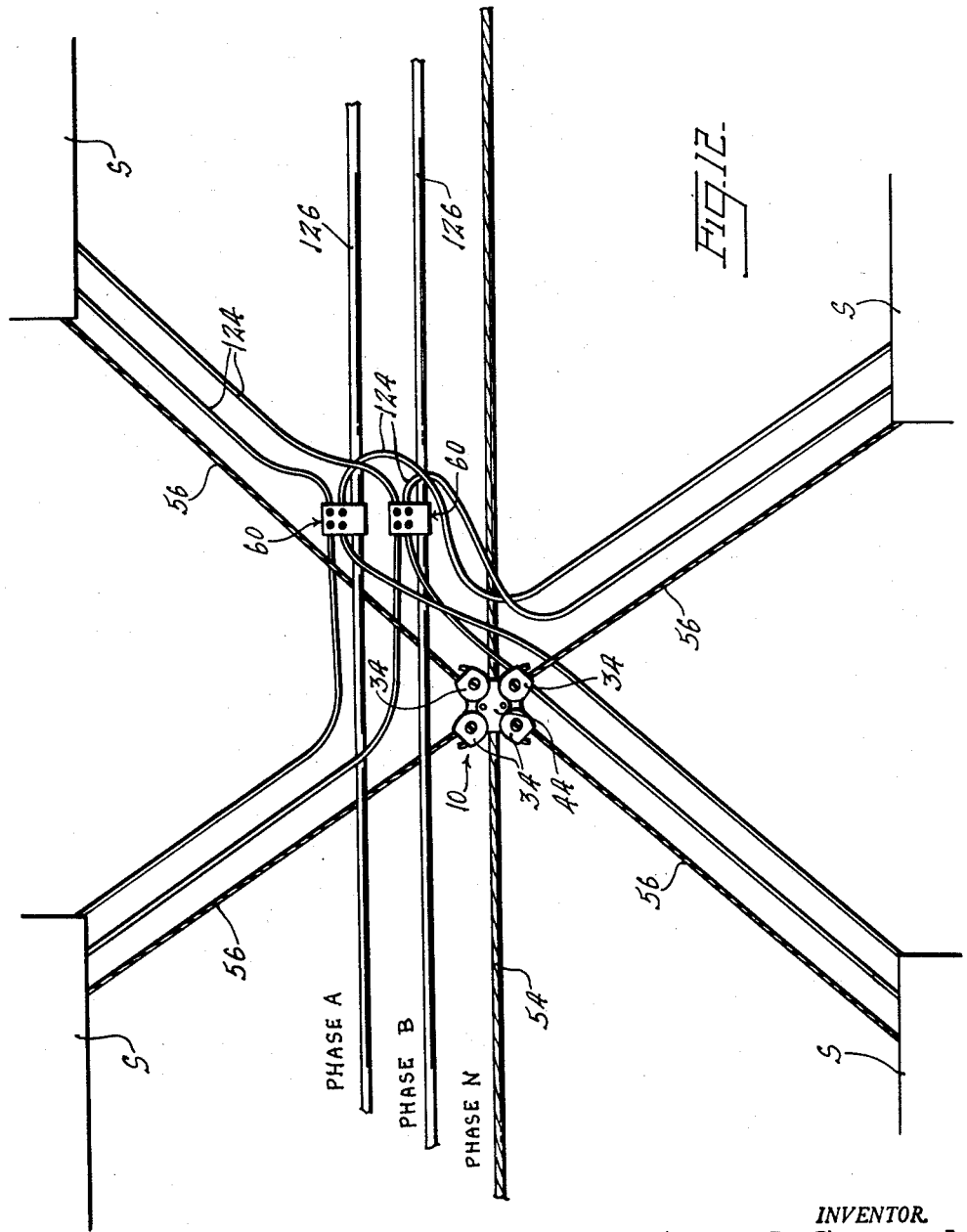

United States Patent Office 2,935,550
Patented May 3, 1960

2,935,550

CONNECTORS FOR ELECTRICAL CABLES OR CONDUCTORS

Alfred B. Gunthel, Jr., Brooklyn, N.Y., assignor to Dossert Mfg. Corp., Brooklyn, N.Y., a corporation of New York Substituted for abandoned application Serial No. 482,584, January 18, 1955. This application August 12, 1957, Serial No. 678,260

1 Claim. (Cl. 174—71)

This invention relates to connectors for electrical cables or conductors. More particularly, the invention has reference to a connector attachable to overhead aluminum, neutral phase secondary feeder or main cable, such as a cable of the type strung between electrical power company poles. A connector according to the invention, when secured to a main cable of the type referred to, is itself adapted for connection to a single or a plurality of service drop cables, leading from the secondary main neutral phase cable or conductor to a corresponding number of adjacent buildings, such as homes in a residential community, that are to be serviced with electric power.

The invention is a substitute for my abandoned application filed on January 18, 1955, Serial No. 482,584, and further relates to a connector for each of the insulated phase cables.

Conventionally, three secondary main cables are extended in side-by-side relation, these being a bare neutral cable, commonly called a phase N cable; and two insulated main cables, respectively termed phase A and phase B. From these main cables, three service drop cables are extended to each building to be served, these being a bare phase N cable and insulated phase A and phase B cables.

The service drop cables extending to a number of different buildings are usually connected to their associated main cables at a single location, that is, from said single location along the length of the side-by-side main cables there will be extended a set of three cables to each of perhaps four different nearby buildings.

At the location specified, conventionally, a complicated assembly of cables and connectors is usually required.

This is a relatively expensive arrangement, and an important object of the present invention is to provide a neutral phase cable connector which can be secured to the phase N cable at locations between the supporting poles, to permit the extension of neutral phase cables from the connector to as many as four different common nearby buildings. The neutral phase connector constituting the invention is particularly adapted for use in association with phase A and phase B connectors, also capable of being attached to their associated main cables at locations between the poles, near the phase N connector, the arrangement thus being a simplified one which can permit the various connections to be made in a minimum amount of time, and with a minimum difficulty.

The neutral phase connector constituting the present invention is preferably formed from cast aluminum, and is capable of being manufactured in quantity at low cost, from a plurality of interfitting parts capable of being swiftly bolted to one another in positions to securely grip the main and drop cables.

Another object is to provide, for use with the phase N connector, a novel and efficient connector for the A and B phase cables.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a view in top plan of the neutral phase connector constituting the present invention, partly broken away.

Fig. 2 is an edge elevational view as seen from line 2—2 in Fig. 1.

Fig. 3 is an enlarged perspective view of one of the service drop clamp plates, per se.

Fig. 4 is a bottom plan view of the clamp plate of Fig. 3.

Fig. 5 is a perspective view, on an enlarged scale, of the main cable clamp plate, per se.

Fig. 6 is a transverse sectional view on line 6—6 of Fig. 5.

Fig. 7 is an assembled top plan view of the connector supporting the cables.

Fig. 8 is an exploded perspective view of a connector used for the insulated phase conductors.

Fig. 9 is an enlarged longitudinal section through the assembled connector of Fig. 8.

Fig. 10 is a transverse section on line 10—10 of Fig. 9.

Fig. 11 is a transverse section on line 11—11 of Fig. 9.

Fig. 12 is a top plan view of the connectors in operative, clamping relationship to the secondary main cables and to a plurality of service drop cables.

The neutral phase cable connector 10 constituting the present invention includes a flat, cruciform clamp base 12 cast in a single piece from aluminum material or the like. The clamp base may appropriately be considered as having a centrally disposed, generally rectangular body portion integral at its respective sides with outwardly extending arms 14. Each arm 14 is identical to the other arms, and hence, only one will be described.

Each arm 14 tapers in a direction away from the body portion, and includes a raised center part 16 correspondingly tapered in a direction away from the body portion and having a rounded inner end. The center part 16 has a flat top surface and formed in the said top surface is a cavity 18 in which is centrally formed a square, bolt-receiving opening 22.

Extending about the raised part 16 is a horseshoe-shaped, shallow groove 20 the opposite ends of which open upon the outer end of the arm 14. Groove 20 is transversely, downwardly curbed at its bottom, for seating therein of a service drop cable of circular cross section.

Extending upwardly from opposite sides of the arm 14, at the respective ends of the groove 20, in extension of the outer side wall of the groove, are lugs 24.

Extending diagonally of the body portion of the clamp base is a straight main cable groove 26 which, like the service drop cable grooves 20, has a transversely depressed bottom. Groove 26 opens upon the opposite corners of the body portion between which the groove diagonally extends, and at opposite sides of the intermediate portion of the groove 26 there are provided raised portions 28. The raised portions 28 have longitudinally curved outer edges, the inner edges of the raised portions being in alignment with the respective side edges of groove 26. The raised portions 28 are widest at their midlength points, said raised portions tapering substantially from this point toward their opposite ends.

Extending along the outside edges of the raised portions 28, from end to end thereof, are upwardly projecting, longitudinal support flanges 30, and between the midlength portions of the flanges 30 and the straight inner sides of the raised portions 28, square bolt holes 32 are formed.

Removably connectable to and overlying each arm 14 is a service drop clamp plate 34. The clamp plates 34 taper in the direction of their outer ends substantially in correspondence with the taper of the arms 14, the outer ends of the plates 34 being straight and being flush with the outer ends of the arms 14. The wider, inner ends of the plates 34 are rounded, correspondingly to the curvature of the bight portion of groove 20.

As shown in Figs. 3 and 4, the underside of each plate 34 is formed with a depression 36 complementary to the raised part 16 of the arm 14, thus permitting the clamp plates to be interfitted with the arms. When the clamp plate is engaged with its associated arm, a square opening 38 formed in the central portion of the clamp plate in communication with the depression 36 is in registration with opening 22 of the arm, to receive a bolt or other connecting element.

At their smaller, outer ends, the clamp plates are each formed with an indentation 40 on the outer side surfaces thereof, receiving lugs 24 of the arm, thus to further engage the clamp plate against lateral deviation from the arm when connected thereto. The lugs 24, being disposed at the outer ends of the grooves, serve as abutments which will engage the drop cables extending through the clamp base, should said cables when pulled laterally of the clamp plates tend to shift out of their associated grooves 20.

The underside of the clamp plate, as shown in Figs. 3 and 4, has a continuous, horseshoe-shaped, downwardly facing groove 42 which is transversely curved oppositely to the transverse curvature of groove 20 of the arm, and which is in registration with said groove 20 when the clamp plate is applied to the arm. Grooves 20, 42 thus cooperate to form a U-shaped or horseshoe-shaped passage of approximately circular cross section (Fig. 2), in which the drop cable is extended and is clampably engaged when the clamp plate is fixedly connected to the arm by a bolt passing through openings 22, 38.

Referring to Figs. 5 and 6, there is here shown the secondary main cable clamp plate 44, also formed of aluminum or other electrically conductive material. This has a widened body portion medially between its ends, the outer longitudinal edges of which are oppositely and outwardly curved correspondingly to the flanges or ribs 30. The body portion tapers in the direction of the respective ends of the secondary main cable clamp plate, and in the widest part thereof has transversely aligned, square bolt holes 48 disposed at opposite sides of the longitudinal center line of the secondary main cable drop plate.

The tapered ends of the plate 44 merge into straight longitudinal extensions 50 of approximately rectangular cross section, and in the underside of the plate 44 there is formed a longitudinal, downwardly facing, transversely curved groove 52 extending the full length of the plate, longitudinally and centrally of the plate, said groove extending continuously along the undersides of the extensions 50 and body portion of the plate 44. The groove 52 is aligned with the upwardly facing groove 26 of the supporting body 12 of the device, and as shown in Figs. 5 and 6, when the grooves are so aligned, longitudinal flanges 46, formed upon the opposite sides of the plate 44 and extending the full length of the body portion thereof, are supported upon the flanges or ribs 30 of body 12.

In use, the device of Figs. 1–7 would appear as in Fig. 12. A secondary main or feeder phase N cable 54, extending between support poles, not shown, is seated in the opposed, diagonally extended grooves 26, 52. Service drop cables 56 extend straight outwardly from the several arms of the device, the cables 56 being seated in the opposed grooves 20, 42, with the extremity of each cable 56 extending a short distance out of one end of the U-shaped passage defined by grooves 20, 42 on each arm of the device. The cables 56, it will be understood, will extend to a corresponding number of adjacent structures S to be serviced.

With the cables 54, 56 assembled in the manner referred to, the secondary main cable clamp plate 44 is positioned upon the support body, and the service drop cable clamp plates 34 are positioned upon the respective arms. Connecting bolts 58 are then extended through the several registering bolt holes of the clamp plates and supporting body or base, to clampably engage the respective cables. It will be understood that the cables being bare, and the entire article being formed of aluminum or other electrically conductive material, are electrically connected when associated with the device in the manner shown in Fig. 12.

In Figs. 8–11, there is shown a connector 60 for use with phase A and B cables, comprising a rectangular, upwardly opening, insulative hollow base 62 having a rounded front end 64, apertured side lugs 66, and a raised ledge 68 in its bottom. A complementary, insulative cover 70 has a rounded front end 72 and apertured side lugs 74 registering with lugs 66 to receive connecting screws 76. Aligning lugs 78 on the edge of the cover are engageable in recesses 80 of the base and can be provided on the sides as well as on the ends of the cover and base if desired.

A block 82 of electrically conductive material has at one end a cubical body 84 seating on ledge 68. A tongue 86 integral with body 84 includes a boss 88 at opposite sides of which are formed angular recesses 90. Forwardly of the boss the tongue has a transverse, upwardly facing groove 92.

A clamp plate 94 seating on the tongue has depending, angular wings 96 seating in recesses 90, and a downwardly facing, transverse groove 98 complementing groove 92. A smooth-walled opening 100 in the clamp plate registers with a threaded opening 102 of the boss 88, and a screw 104 threaded through the openings connects the clamp plate to the tongue.

A transverse bore 106 formed in body 84 registers with opposed semicircular notches 110, 112 of the cover and base side walls and a bore 108 parallel to bore 106 registers with similar notches 114, 116 of the cover and base. Smooth openings 118 spaced transversely of the top of the cover register with threaded openings 119 of the body 82, and openings 120 of the cover register with threaded openings 121 of the body. The openings 119, 121 communicate with the bores 106, 108 respectively to receive set screws 122 engageable against bare portions of insulated service drop phase A or B cables 124 extending through the bores. A secondary main phase A or B cable 126 has a bare portion extending through grooves 92, 98, the cover and base being notched to receive cable 126.

Fig. 12 shows how a pair of the connectors 60, used with one connector 10, permit four sets of phase A, B and N service drop cables to be extended from a single set of secondary main or feeder cables.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A clamp for electrically connecting a main electrical cable to a plurality of secondary electrical cables, comprising an electrically conductive clamp base formed with a main groove adapted to receive the main cable and with a plurality of secondary grooves adapted to receive the several secondary cables, and main and secondary clamp plates connectable to the base in positions to overlie the respective main and secondary grooves to hold said cables within their associated grooves, the main groove being straight from end to end thereof and extending fully across the base, for receiving an intermediate portion of the main cable, the secondary grooves being substantially U-shaped, each secondary groove opening at its opposite ends upon the periphery of the base at relatively closely spaced apart locations, to receive an extremity of the associated secondary cable bent into a corresponding U-shape, said base being substantially cruciform in outer configuration and including a generally rectangular body portion and arms projecting outwardly from the respective sides of said body portion, the main groove being formed in the body portion and the secondary grooves being formed in the respective arms, said main groove being extended diagonally of the body portion from one corner thereof to an opposite corner, the several clamp plates overlying the base and having grooves in their undersides complementing the grooves of the base, said grooves of the plates and base cooperating to form passages through which the cables extend, each arm having a raised center portion about which the groove of the arm extends, each secondary clamp plate having a cavity receiving said raised portion with the groove of the secondary plate extending about said cavity, each arm being formed with a pair of lugs disposed at the extremities of the groove formed in the arm, along the outer side edges of said grooves of the arms, the secondary clamp plates having indentations receiving said lugs, said main and secondary clamp plates having rectangular holes registering with corresponding holes in said clamp base for receiving bolts to secure the main and secondary clamp plates to said clamp base.

References Cited in the file of this patent

UNITED STATES PATENTS

| | | |
|---|---|---|
| 1,945,575 | Sumpter | Feb. 6, 1934 |
| 1,997,627 | Casey | Apr. 16, 1935 |
| 2,233,905 | Wilson | Mar. 4, 1941 |
| 2,374,971 | Benander | May 1, 1945 |
| 2,471,440 | Mierley | May 31, 1949 |
| 2,728,896 | Aleks | Dec. 27, 1955 |

OTHER REFERENCES

Dossert Manufacturing Corp. (advertisement and article), Electrical World, entitled "Neutral Connector," pages 6 and 150, July 25, 1955.